United States Patent [19]

Goldman

[11] Patent Number: 5,893,969

[45] Date of Patent: Apr. 13, 1999

[54] FILTER VESSEL SAFETY APPARATUS

[75] Inventor: Sidney Goldman, Boca Raton, Fla.

[73] Assignee: Mechanical Manufacturing Corp., Sunrise, Fla.

[21] Appl. No.: 08/998,718

[22] Filed: Dec. 29, 1997

[51] Int. Cl.[6] ............................................. B01D 35/14
[52] U.S. Cl. .......................... 210/95; 210/143; 210/238; 210/341; 210/418
[58] Field of Search ........................... 210/95, 141, 146, 210/234, 238, 340, 341, 419, 448, 452, 143, 418

[56] References Cited

U.S. PATENT DOCUMENTS 3,092,576  6/1963  Daubman .
3,116,755  1/1964  McNeal .
3,618,781  11/1971 Brown .
4,021,345  5/1977  Oida .
4,179,907  12/1979 Schantz .
4,658,605  4/1987  Yanagihara .
4,786,409  11/1988 Miller .
4,919,801  4/1990  Hobson, Jr. .
5,101,850  4/1992  Todd .

Primary Examiner—Jay H. Woo
Assistant Examiner—Fred Prince
Attorney, Agent, or Firm—Martin Sachs

[57] ABSTRACT

A safety apparatus for pressurized filter vessels includes a protective shroud, a mechanical and electrical interlock device that prevents the opening of the filter vessel cover unless the input and output port valves are closed and electrical power to the pressurizing pump is disconnected.

9 Claims, 4 Drawing Sheets

1

FILTER VESSEL SAFETY APPARATUS

BACKGROUND OF THE INVENTION

1. Field of the Invention

The present invention relates to pressurized filter housings, and more particularly, to a protective system for preventing the opening of the filter housing, if the vessel is pressurized and additionally protects personnel from filter housing cover seal leakage.

2. Discussion of the Relevant Art

The prior art discloses devices used for continuously operated filter systems, such as that disclosed in U.S. Pat. No. 5,055,205 issued to White on Oct. 8, 1991. Another apparatus is disclosed in U.S. Pat. No. 5,593,578 issued to Bryan, et al. on Jan. 14, 1997, which utilizes a filter adapter and a filter cartridge for removing particulate matter from an aqueous flow. However, there is no showing or suggestion of a protective apparatus to protect individuals from leaking filter vessel cover seals or insures that the fluid flow is shut off, when the cover of the filter vessel is opened to remove and/or replace the filter material that is full of particulate that has been removed from the aqueous flow.

SUMMARY OF THE INVENTION

Therefore it is an object of the present invention to overcome the shortcomings of the prior art and provide a protection apparatus for individuals that must remove the filter material, laden with unwanted particulate, from a pressurized filter vessel.

It is another object of the present invention to provide a relatively inexpensive protection apparatus for individuals that are required to remove the filter material from a pressurized filter vessel and/or are required to replace a worn out cover seal on the filter vessel.

It is yet another object of the present invention to provide a protective shroud over the top of a pressurized filter vessel to protect individuals near the vessel from fluid spray from a faulty cover seal.

It is still yet another object to provide a protective apparatus that insures that the pressuring pump is turned off, the input and output valves are closed, to prevent fluid flow when the filter vessel cover is opened to remove the filter material laden with particulate.

A safety apparatus for pressurized filter vessels having an inlet port and an outlet port for allowing fluids to pass therethrough, a top opening, a filter for removing particulate from fluid flowing through the hollow vessel housing between the input port and the output port and a cover for covering the filter vessel opening and maintaining a pressurized seal for the filter vessel, according to the principles of the present invention, includes a shroud that encompasses the filter vessel cover, has a clear portion for viewing the vessel cover when in a closed position and is hingedly affixed to the filter vessel housing.

The apparatus further includes a mechanical control device that has a first position, for stopping fluid flow through said input and said outlet ports and a second position, for permitting the fluid to flow therethrough. The control device includes an inlet control valve disposed in series with the inlet port and an outlet control valve disposed in series with the outlet port with a linkage rod with the inlet control valve affixed on one end and the outlet control valve being affixed on the other end thereof.

A mechanical interlock prevents the mechanical control device from moving to the second position unless the shroud and the filter vessel cover are in a closed position.

The foregoing and other objects and advantages will appear from the description to follow. In the description, reference is made to the accompanying drawing, which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims. Like-reference characters are utilized to designate like or corresponding components in the duplicate filter vessel, in order for the reader to better understand features of the invention.

BRIEF DESCRIPTION OF THE DRAWINGS

In order that the invention may be more fully understood, it will now be described by way of example, with reference to the accompanying drawings in which.

DESCRIPTION OF THE PREFERRED EMBODIMENT

Figure 1:
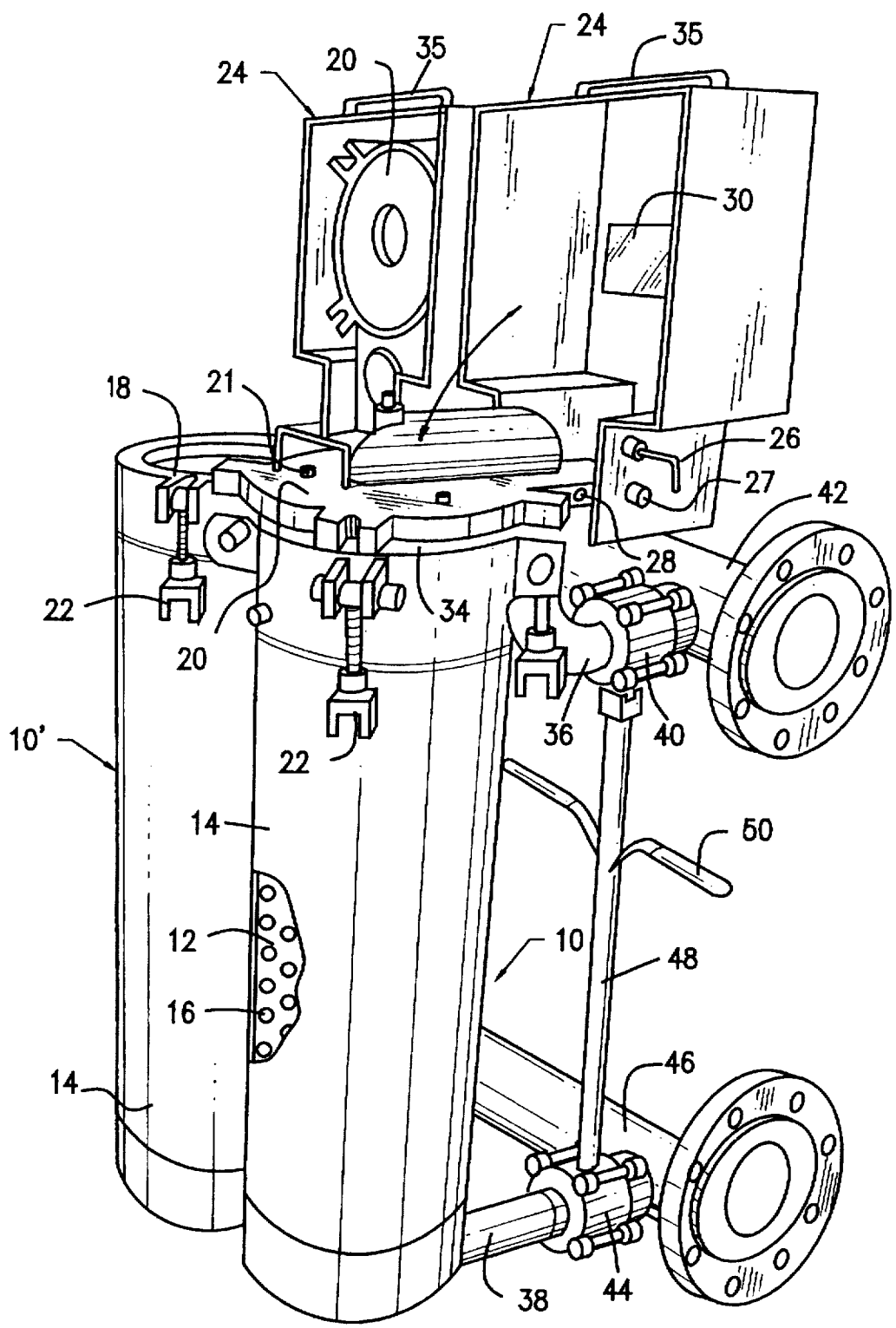
FIG. 1 is an isometric front view of a pair of identical pressurized filter vessels, according to the principals of the present invention.
Figure 2:
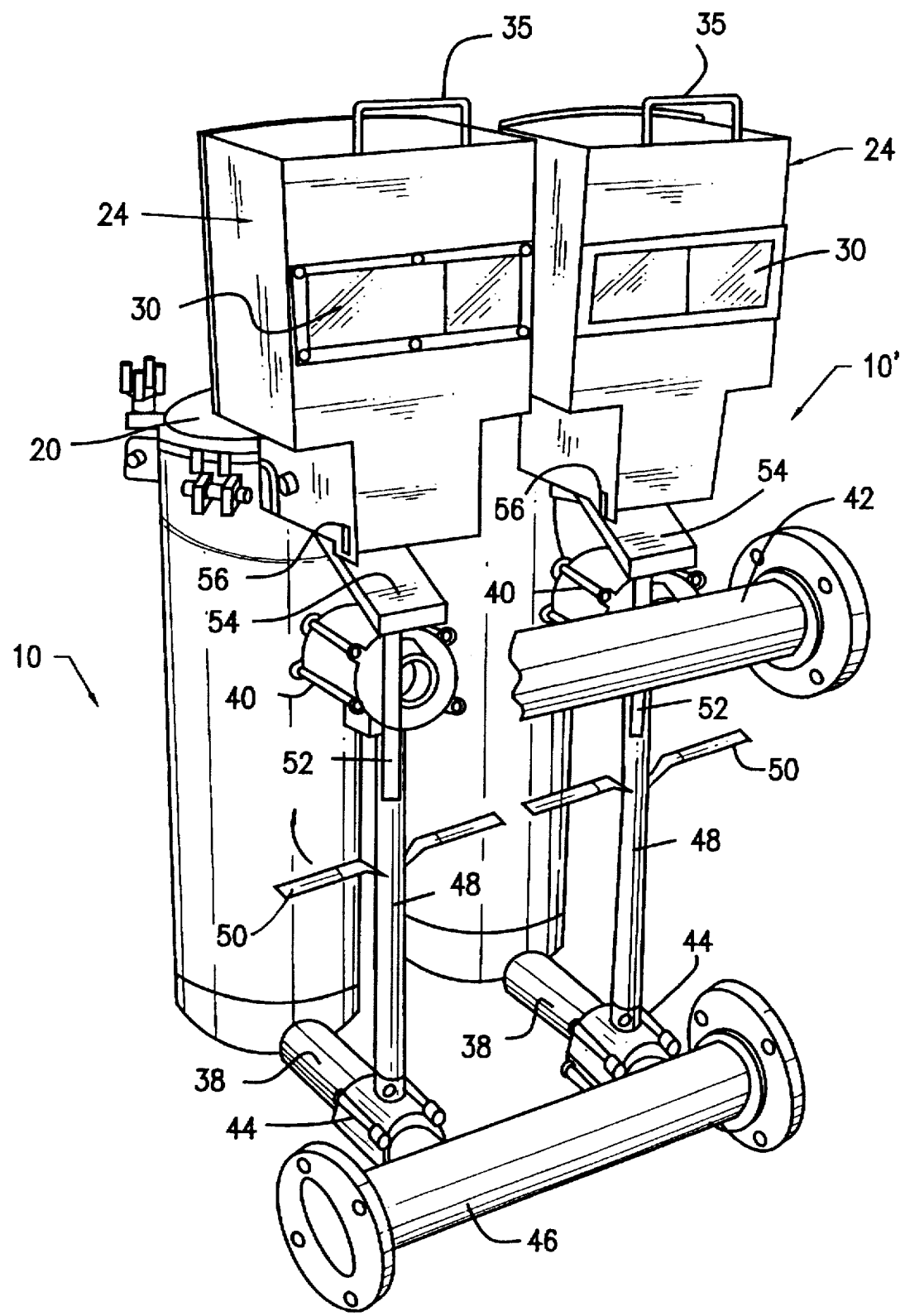
FIG. 2 is an isometric rear view, partially broken away, of the pair of pressurized filter vessels shown in FIG. 1 with the shrouds open and the valves closed.
Figure 3:
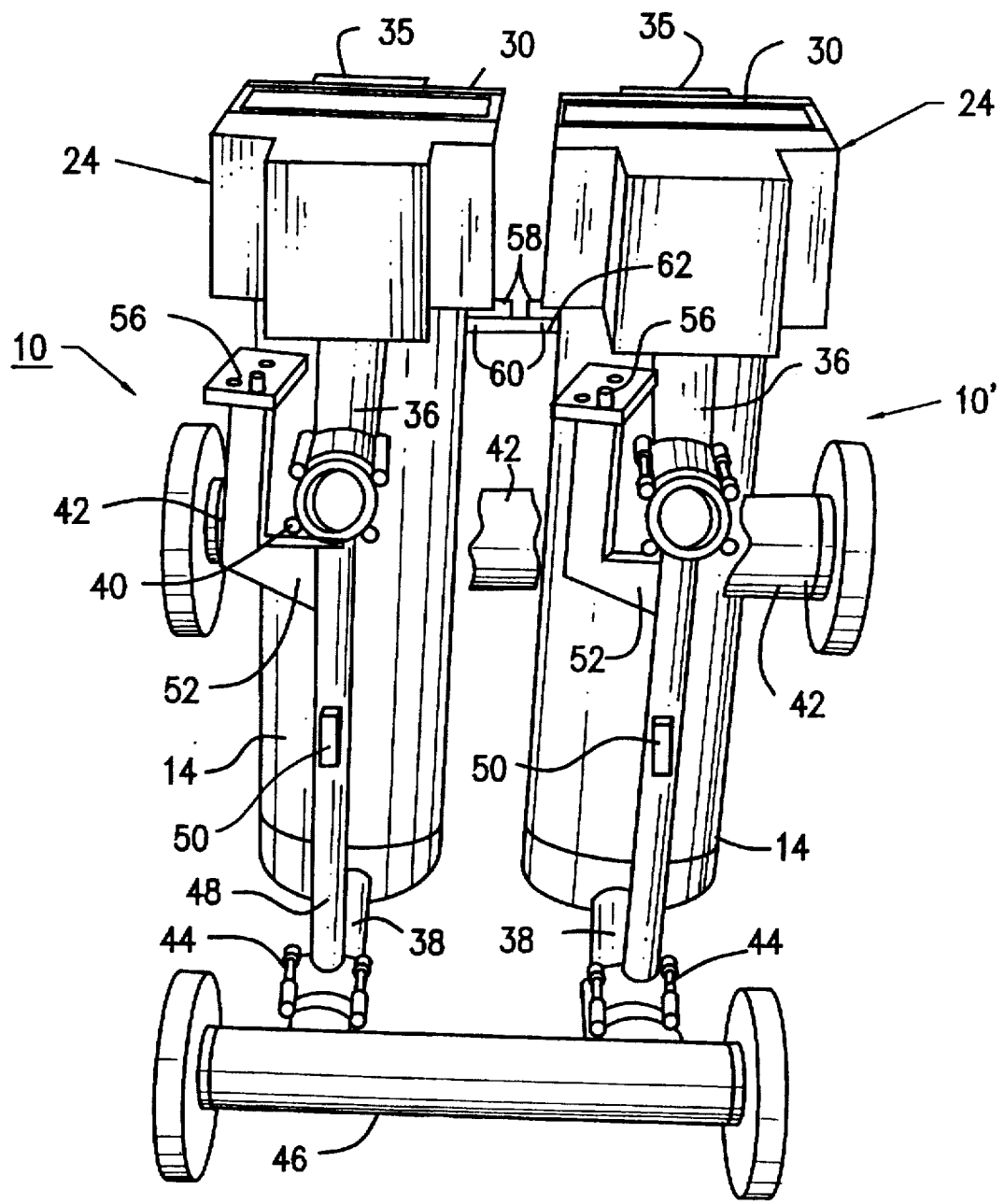
FIG. 3 is a rear view, partially broken away, of the filter vessels of FIGS. 1 and 2 in the operational or second position for permitting fluid flow through the filter vessels.

Referring to the figures and in particular to FIG. 1–3, there is shown a front and rear view of a pair of identical pressurized filter vessels, according to the principals of the present invention, which include a pair of pressurized filter vessels 10 and 10' that are of a type disclosed in U.S. Pat. No. 5,246,581 issue on Sep. 21, 1993 to Sidney Goldman.

The filter vessel 10 includes a filter basket 12 disposed within the hollow filter vessel housing 14 with the filter material 16 disposed within the filter basket 12. One end of the filter vessel housing 14 is provided with an opening 18 that is covered and sealed by a cover 20 by plurality of conventional clamping mechanisms 22.

The cover 20 is shown in a closed position on filter vessel 10 and on the open position in filter vessel 10' wherein it is disposed, in a nesting position, within the shroud 24. The cover 20 is maintained in the nesting position by a spring loaded mechanism 26 provided on the shroud 24 having a cooperating aperture provided on the cover 20 and is hingedly fastened by means of a lag bolt 27 to the filter vessel housing 14 on an extending lip portion 34 provided proximate the filter vessel opening 18. The cover 20 is also provided with receptacles 21 for receiving gages therein, not shown.

Figure 4:
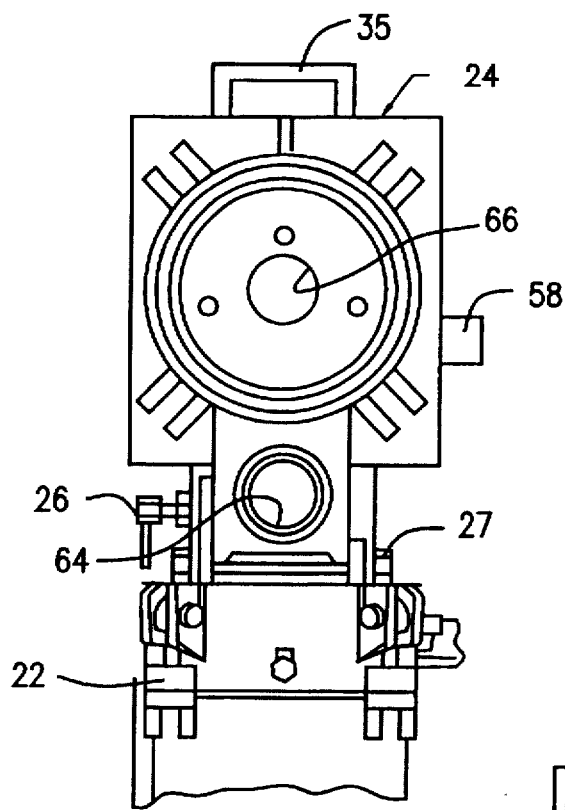
FIG. 4 is an enlarged partial front view with the cover and shroud in the open position.
Figure 5:
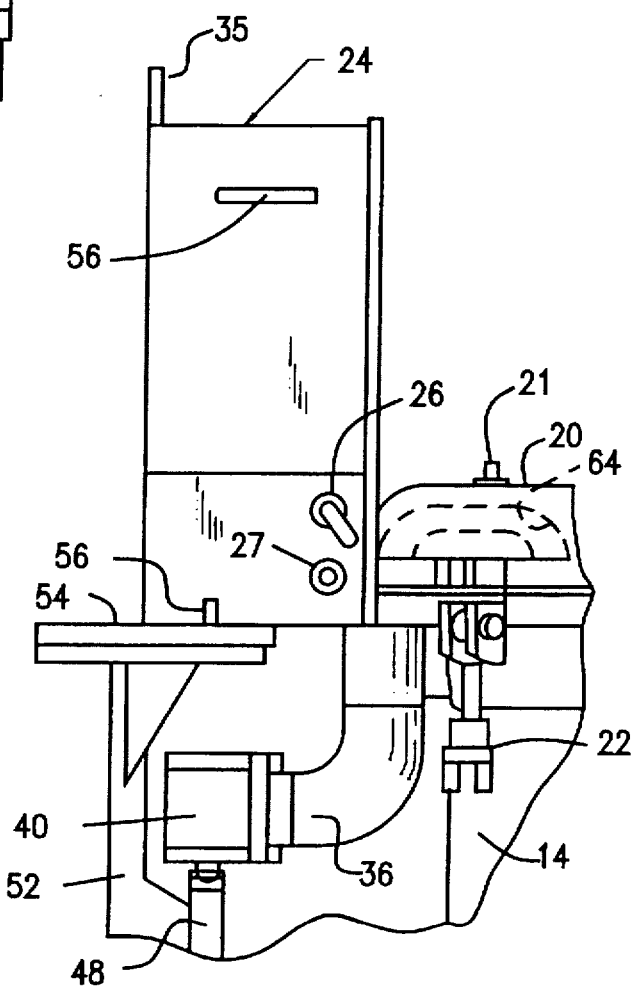
FIG. 5 is an enlarged partial side view in elevation with the cover in a closed position and the shroud in the open position.

The shroud 24 is provided with a viewing window 30 fabricated from a polycarbonate material, such as Lexan or Plexiglas, to view gages that monitor e.g. temperature, pressure, etc., not shown, mounted in the cover 20 and is hingedly fastened to the vessel housing 12 on the extending lip portion 34 in the same manner that the cover is hingedly affixed on the filter vessel housing 14. The shroud is also provided with a handle 35 for ease in raising it to the open position. (See FIGS. 4 and 5.)

The inlet port 36 to the housing 14, in the preferred embodiment, is provided in the cover 20 so that the input fluid to be filtered flows over the top of the filter basket 12 when entering the filter vessel housing 14. The outlet port 38 of the housing 14 is provided proximate the closed portion of the filter vessel housing 14, preferably below the bottom of the filter basket 12.

An inlet control valve 40 is disposed in series with the filter vessel input port 36 and its connection to the main fluid line 42 in which the unfiltered fluid flows. An outlet control valve 44 is disposed in series with the filter vessel output port 38 and its connection to the main fluid line 46 in which the filtered fluid flows. The inlet control valve 40 and the outlet control valve 44 are connected by a linkage rod 48 so that valves 40 and 48 are simultaneously in a closed position (first position) prohibiting fluid flow therethrough. When the linkage rod 48 is rotated 90 degrees to the open position (second position) the valves 40 and 48 are simultaneously moved to an open position permitting fluid flow therethrough. The linkage rod 48 is provided with a handle 50 to make it easier to rotate from the first position to the second position. In the open or first position the handle 50 is pointed towards the filter vessel housing 14 and in the closed or second position the handle is positioned parallel to the main fluid lines 42 and 46.

The linkage rod 48 has affixed thereon an outwardly extending L-shaped bracket 52 (see FIG. 2, 3 and 5) with an adjustable platform 54 disposed on the distal end thereof. The platform 54 is provided with an upwardly extending protrusion 56 that will prevent the linkage 48 from rotating to the second or valve opened position unless the shroud 24 and cover 20 are in a closed position.

The shroud 24 is also provided with an extending portion 58 adapted to activate an interlock switch 60, mounted on a bracket 62 disposed between the filter housings 14, that allows power to be supplied to the pressure pump, not shown, only when the shroud is in a closed position.

In operation, the handle 50 is placed in the first position (closed valves) with the handles 50 parallel to the main fluid flow lines 42 and 46. The shroud 24 is opened as well as the filter cover 20 and the filter material 16 is installed or replaced, as required. Once the material 16 is replaced the cover 20 is closed and locked by the clamping mechanism 22. Thereafter, the shroud 24 is closed, thereby permitting the handle 50 to rotate the linkage rod 48 to the second or open position permitting the unfiltered fluid to flow from the main line 42 through valve 40 into inlet port 36 and channel 64 provided in the cover 20 where it exits, via opening 66, to the center of the filter basket 12 and filter material 16. Thereafter the filtered fluid exits, via the outlet port 38, valve 44 and into the main filtered line 46. Once the system is operating, any filter vessel 10 may be taken off the line for maintenance or replacing the filter material 16 without fear of injury to personnel performing the maintenance, since with the valves in the second position the shroud 24 or cover 20 can not be opened. The linkage rod 48 must be rotated 90 degrees before the protrusion 56 will allow the shroud 24 to be opened. Opening the shroud 24 will remove power because the interlock switch will be opened removing power from the pressurizing pump and the valves 40 and 46 being closed will prevent any additional fluid from flowing into or out of the filter housing 10.

Hereinbefore has been disclosed a safety apparatus for pressurized filter vessels. The apparatus is capable of protecting personnel from dangerous fluids under pressure that are required to filtered. It will be understood that various changes in the detail, materials, arrangements of parts and operating conditions which have been herein described and illustrated in order to explain the nature of the invention may be made by those skilled in the art within the principles and scope of the instant invention.

Having thus set forth the nature of the invention, what is claimed is:

1. A safety apparatus for pressurized filter vessels comprising, in combination:

A. a hollow filter vessel housing having;
   i) an inlet port and an outlet port for allowing fluids to pass therethrough,
   ii) an opening communicating with the interior of said hollow filter vessel,
   iii) filter means for removing particulate from said fluid disposed within said hollow vessel housing, between said input port and said output port, and
   iv) cover means for covering said filter vessel opening maintaining a pressurized seal for said filter vessel;

B. shroud means hingedly affixed to said filter vessel housing for covering said filter vessel cover means;

C. mechanical control means having a first position for stopping the fluid flow through said input and said outlet ports and a second position for permitting said fluid to flow therethrough, said control means including;
   i) an inlet control valve disposed in series with said inlet port,
   ii) an outlet control valve disposed in series with said outlet port, and
   iii) linkage means having said inlet control valve affixed on one end and said outlet control valve affixed on the other end thereof; and D. mechanical interlock means for preventing the mechanical control means from moving to said second position unless said shroud and said filter means cover are in a closed position.

2. A safety apparatus for pressurized filter vessels according to claim 1, wherein said linkage means includes:

a) a handle means for rotating said linkage means from said first position to said second position.

3. A safety apparatus for pressurized filter vessels according to claim 1, wherein said mechanical interlock means includes an outwardly extending platform means for preventing said shroud means from opening to an open position when said control means is in said second position.

4. A safety apparatus for pressurized filter vessels according to claim 1, further including an electrical interlock switch means having cooperating portions disposed on said shroud means and on said cover means for preventing electrical power from being applied to the pump that pressurizes said filter vessels when said shroud means is in an open position.

5. A safety apparatus for pressurized filter vessels according to claim 3, wherein said shroud means further includes one half of a mating means with the other half thereof being disposed on said outwardly extending platform means to prevent said mechanical control means from being moved to said second position unless said shroud is closed.

6. A safety apparatus for pressurized filter vessels according to claim 1, further including a second retaining means disposed on said shroud means for retaining said cover means in a nesting position in said shroud means when said cover means and said shroud means are in an open position.

7. A safety apparatus for pressurized filter vessels comprising, in combination:
  A. a hollow filter vessel housing having;
    i) an outlet port for allowing fluids to pass therethrough,
    ii) an opening communicating with the interior of said hollow filter vessel,
    iii) cover means for covering said filter vessel opening and maintaining a pressurized seal for said filter vessel, said cover means including an inlet port therein;
    iv) filter means for removing particulate from said fluid disposed within said hollow vessel housing, between said input port and said output port, and
  B. shroud means for covering said filter means cover means, said shroud means including;
    i) a clear portion for viewing said cover means when in a closed position,
    ii) means for hingedly affixing said shroud to said filter vessel housing,
    iv) a second retaining means for retaining said cover means in a nesting position therein when said cover means and said shroud means are in an open position, and
    v) one half of a mating means;
  C. mechanical control means having a first position for stopping the fluid flow through said input and said outlet ports and a second position for permitting said fluid to flow therethrough, said control means including;
    i) an inlet control valve disposed in series with said inlet port,
    ii) an outlet control valve disposed in series with said outlet port, and
    iii) linkage means having said inlet control valve affixed on one end and said outlet control valve affixed on the other end thereof,
    iv) handle means for rotating said linkage means from said first position to said second position; and
  D. mechanical interlock means for preventing the mechanical control means from moving to said second position unless said shroud and said filter means cover are in a closed position, including an outwardly extending platform means for preventing said shroud means from going to an open position when said control means is in said second position, said outwardly extending platform means including the other half of said mating means to prevent said movement.

8. A safety apparatus for pressurized filter vessels according to claim 7, further including an electrical interlock switch means having cooperating portions disposed on said shroud means and on said cover means for preventing electrical power from being applied to the pump that pressurizes said filter vessels when said shroud means is in an open position.

9. A safety apparatus for pressurized filter vessels according to claim 1, wherein said shroud means includes a clear portion for viewing said cover means when in a closed position.

* * * * *

UNITED STATES PATENT AND TRADEMARK OFFICE
CERTIFICATE OF CORRECTION

PATENT NO. : 5,893,969
DATED : April 13, 1999
INVENTOR(S) : Sidney Goldman

It is certified that error appears in the above—identified patent and that said Letters Patent is hereby corrected as shown below:

Column 5, line 22; delete "iv" and insert therefor --iii--.

Column 5, line 26; delete "v" and insert therefor --iv--.

Signed and Sealed this

Twenty-fourth Day of August, 1999

Attest:

Q. TODD DICKINSON

*Attesting Officer*      *Acting Commissioner of Patents and Trademarks*